US007406368B2

(12) United States Patent  
Arnouse

(10) Patent No.: US 7,406,368 B2
(45) Date of Patent: Jul. 29, 2008

(54) APPARATUS, SYSTEM AND METHOD FOR AIRCRAFT SECURITY AND ANTI-HIJACKING INTERVENTION

(76) Inventor: Michael Arnouse, 15 Hickory Dr., Old Brookville, NY (US) 11791

( * ) Notice: Subject to any disclaimer, the term of this patent is extended or adjusted under 35 U.S.C. 154(b) by 142 days.

(21) Appl. No.: 11/119,049

(22) Filed: Apr. 29, 2005

(65) Prior Publication Data

US 2005/0219064 A1 Oct. 6, 2005

Related U.S. Application Data

(63) Continuation-in-part of application No. 10/894,253, filed on Jul. 19, 2004, now Pat. No. 7,376,494, which is a continuation-in-part of application No. 10/643,101, filed on Aug. 18, 2003, now Pat. No. 7,024,023.

(60) Provisional application No. 60/482,807, filed on Jun. 26, 2003, provisional application No. 60/609,601, filed on Sep. 14, 2004.

(51) Int. Cl.
*G01C 23/00* (2006.01)
*G05D 1/00* (2006.01)
*G05D 3/00* (2006.01)

(52) U.S. Cl. .................. 701/3; 701/11; 244/118.5; 340/5.82; 340/963; 340/5.8; 382/115

(58) Field of Classification Search .............. 701/2, 701/11, 3; 340/944, 574, 979, 988, 5.8, 5.82, 340/963; 244/118.5; 382/115
See application file for complete search history.

(56) References Cited

U.S. PATENT DOCUMENTS

| 3,459,393 A | * | 8/1969 | Thomas .................. 244/63 |
| 3,893,538 A | * | 7/1975 | Thompson et al. ........ 180/117 |
| 3,945,589 A | * | 3/1976 | Crompton .................. 244/30 |
| 4,107,775 A | | 8/1978 | Ott |
| 4,525,859 A | | 6/1985 | Bowles et al. |
| 4,646,244 A | | 2/1987 | Bateman et al. |

(Continued)

FOREIGN PATENT DOCUMENTS

AU 2007202764 A1 * 6/2007

(Continued)

OTHER PUBLICATIONS

Technology review—Biometrics-Technology, Application, Challenge, and Computational Intelligence Solutions; Qinghan Xiao; Computational Intelligence Magazine, IEEE: vol. 2, Issue 2, May 2007 pp. 5-25; Digital Object Identifier 10.1109/MCI.2007. 353415.*

(Continued)

*Primary Examiner*—Cuong Nguyen
(74) *Attorney, Agent, or Firm*—DLA Piper US LLP

(57) ABSTRACT

A security mechanism identifies users, so as to restrict access and operation to authorized users, such as to persons authorized to access and fly a particular aircraft. The security mechanism comprises one or more security devices to identify the user attempting to gain access or operate the controller; and one or more monitoring devices to determine whether or not the user identified is authorized to have access or operate the controller. Methods of safely operating aircraft are also described. The methods include protocols for limiting access to the aircraft and assuming remote control of the aircraft if a possibly hostile situation is detected.

15 Claims, 9 Drawing Sheets

U.S. PATENT DOCUMENTS

| | | | |
|---|---|---|---|
| 5,615,622 A * | 4/1997 | Moses et al. ............... 109/2 |
| 5,686,765 A | 11/1997 | Washington |
| 5,715,905 A | 2/1998 | Kaman |
| 5,719,950 A | 2/1998 | Osten et al. |
| 5,959,541 A * | 9/1999 | DiMaria et al. ............ 340/5.52 |
| 5,978,715 A | 11/1999 | Briffe et al. |
| 6,100,811 A | 8/2000 | Hsu et al. |
| 6,111,977 A | 8/2000 | Scott et al. |
| 6,119,096 A | 9/2000 | Mann et al. |
| 6,173,219 B1 | 1/2001 | Deker |
| 6,219,439 B1 | 4/2001 | Burger |
| 6,225,890 B1 | 5/2001 | Murphy |
| 6,421,943 B1 | 7/2002 | Caulfield et al. |
| 6,442,465 B2 | 8/2002 | Breed et al. |
| 6,474,603 B1 | 11/2002 | Kinkead et al. |
| 6,498,970 B2 | 12/2002 | Colmenarez et al. |
| 6,559,769 B2 | 5/2003 | Anthony et al. |
| 6,641,087 B1 | 11/2003 | Nelson |
| 6,658,572 B1 * | 12/2003 | Craig ........................ 726/16 |
| 6,675,095 B1 | 1/2004 | Bird et al. |
| 6,698,051 B2 * | 3/2004 | Hutton ....................... 14/71.5 |
| 6,877,097 B2 * | 4/2005 | Hamid et al. ............... 713/186 |
| 6,894,611 B2 | 5/2005 | Butz et al. |
| 6,925,565 B2 * | 8/2005 | Black ........................ 713/186 |
| 6,965,816 B2 * | 11/2005 | Walker ...................... 701/16 |
| 7,024,023 B2 * | 4/2006 | Arnouse ..................... 382/116 |
| 7,127,334 B2 | 10/2006 | Frink |
| 7,155,034 B1 | 12/2006 | Recce |
| 7,328,012 B2 * | 2/2008 | Ziarno et al. ............... 455/431 |
| 2003/0033084 A1 | 2/2003 | Corcoran, III |
| 2003/0055540 A1 | 3/2003 | Hansen |
| 2003/0055564 A1 | 3/2003 | Tart et al. |
| 2003/0067379 A1 | 4/2003 | Riley |
| 2003/0068044 A1 | 4/2003 | Nikolsky |
| 2003/0071743 A1 | 4/2003 | Seah et al. |
| 2003/0090382 A1 * | 5/2003 | Shear ........................ 340/574 |
| 2003/0093187 A1 * | 5/2003 | Walker ...................... 701/1 |
| 2003/0145403 A1 * | 8/2003 | Hutton ....................... 14/71.5 |
| 2003/0158762 A1 * | 8/2003 | Wu ............................ 705/5 |
| 2003/0160708 A1 * | 8/2003 | Knoop ....................... 340/958 |
| 2004/0107027 A1 | 6/2004 | Boudrieu |
| 2004/0169076 A1 * | 9/2004 | Beale et al. ................. 235/382 |
| 2004/0217232 A1 | 11/2004 | Yount et al. |
| 2005/0116098 A1 * | 6/2005 | Martens et al. ........... 244/118.5 |

FOREIGN PATENT DOCUMENTS

| | | | |
|---|---|---|---|
| CA | 2242031 A1 * | 3/1999 |
| DE | 10149681 A1 | 4/2003 |
| DE | 10149681 A1 * | 4/2003 |
| GB | 2382907 B * | 2/2006 |

OTHER PUBLICATIONS

Developmental Tools—Synthetic Biometrics; Yanushkevich, S.N.; Stoica, A.; Shmerko, V.P.; Computational Intelligence Magazine, IEEE; vol. 2, Issue 2, May 2007 pp. 60-69; Digital Identifier 10.1109/MCI.2007.353421.*

A Fast Search Algorithm for a Large Fuzzy Database; Hao, F.; Daugman, J.; Zielinski, P.; Information Forensics and Security, IEEE Transactions on; vol. 3, Issue 2, Jun. 2008 pp. 203-212; Digital Object Identifier 10.1109/TIFS.2008.920726.*

Comparing passwords, tokens, and biometrics for user authentication; O'Gorman, L.; Proceedings of the IEEE vol. 91, Issue 12, Dec. 2003 pp. 2021-2040; Digital Object Identifier 10.1109/JPROC.2003.819611.*

Semantic Framework for Biometric-Based Access Control Systems; Yanushkevich, S.N.; Stoica, A.; Shmerko, V.P.; Computational Intelligence for Homeland Security and Personal Safety, Proceedings of the 2006 IEEE International Conference on Oct. 2006 pp. 11-16; Digital Object Identifier 10.1109/CIHSPS.2006.313292.*

Red-Eye Blink, Bendy Shuffle, and the Yuck Factor: A User Experience of Biometric Airport Systems; Sasse, M.A.; Security & Privacy, IEEE; vol. 5, Issue 3, May-Jun. 2007 pp. 78-81; Digital Object Identifier 10.1109/MSP.2007.69.*

Application and Evaluation of a 2D+3D Face Authentication System; Tsalakanidou, F.; Malassiotis, S.; 3DTV Conference, 2007 May 7-9, 2007 pp. 1-4; Digital Object Identifier 10.1109/3DTV.2007.4379473.*

Transportation security technologies research and development; Hallowell, S.F.; Jankowski, P.Z.; Military Communications Conference, 2005. MILCOM 2005. IEEE; Oct. 17-20, 2005 pp. 1753-1756 vol. 3; Digital Object Identifier 10.1109/MILCOM.2005.1605927.*

* cited by examiner

APPARATUS, SYSTEM AND METHOD FOR AIRCRAFT SECURITY AND ANTI-HIJACKING INTERVENTION

CROSS REFERENCE TO RELATED APPLICATIONS

The present application is a Continuation-in-Part of U.S. patent application Ser. No. 10/894,253, filed Jul. 19, 2004 now U.S. Pat. No. 7,376,494, which is a Continuation-in-Part of U.S. patent application Ser. No. 10/643,101 filed Aug. 18, 2003, which is now U.S. Pat. No. 7,024,023, and claims priority from U.S. Provisional Patent Application No. 60/482, 807 filed Jun. 26, 2003, and U.S. Provisional Patent Application No. 60/609,601 filed Sep. 14, 2004, the entire disclosures of which are incorporated by reference herein.

FIELD OF THE INVENTION

The present invention relates generally to security mechanisms and methods, and more particularly to aircraft security mechanisms and methods.

BACKGROUND OF THE INVENTION

The airline industry has, for over half a century, transported large volumes of travelers on a daily basis to destinations around the world. One of the primary concerns of the airline industry during this time period has been to maintain the safety of its passengers and aircraft. Over time, the general public, and most airline passengers, developed a positive feeling for airline safety. Statistically speaking, air travel has been considered safer than other presumably safe activities; for example, routinely there have been more people involved in auto or gun related accidents or fires than people involved in aircraft related accidents. The occasional hijacking was not considered a major threat, as most ended without passenger casualties or damage to aircraft.

The attitude toward air travel forever changed on the morning of Sep. 11, 2001, when the World Trade Center in New York, N.Y. and the Pentagon in Washington, D.C. became the objects of a terrorist attack of previously unimaginable proportions. On that day, hijackers took over control of four separate aircraft and then managed to personally fly three of those as weapons of mass murder into the buildings, destroying the buildings, surrounding buildings and all three aircraft. The fourth plane crashed into an open field just outside of Pittsburgh following a valiant struggle by passengers to recapture the plane. Tragically, all passengers on all four planes and several thousand people on the ground died that day.

Following the aftermath of "911", there is now a greater emphasis than ever before on improving airline security to try to prevent hijacking of aircraft. Much of the efforts have been directed to reducing the chances that a successful hijacking may occur, such as by instituting more stringent searches at check-in, by placing armed marshal on flights and by better securing the door separating the passenger and cockpit areas of the plane. These efforts, however, have done little to address the source of the problem, which is hijackers taking over control of an aircraft.

In view of which, there is seen a need to improve the manner by which the occurrences of hijacking on aircraft can be reduced.

SUMMARY OF THE INVENTION

In accordance with the present invention, an embodiment comprises a security mechanism for identifying individuals, so as to restrict operation to only those authorized, such as to persons authorized to fly a given aircraft. The security mechanism comprises a controller operable by a user; one or more security devices to identify the user attempting to operate the controller; and one or more monitoring devices to determine whether or not the user identified is authorized to operate the controller.

The invention also relates to methods of safely operating aircraft, including methods by which automated or remote control can be assumed in the event of a possibly hostile situation. The invention also relates to methods of limiting access to aircraft, authenticating individuals requesting access to aircraft and categorizing individuals who are given access to aircraft.

DESCRIPTION OF THE INVENTION

Figure 1:
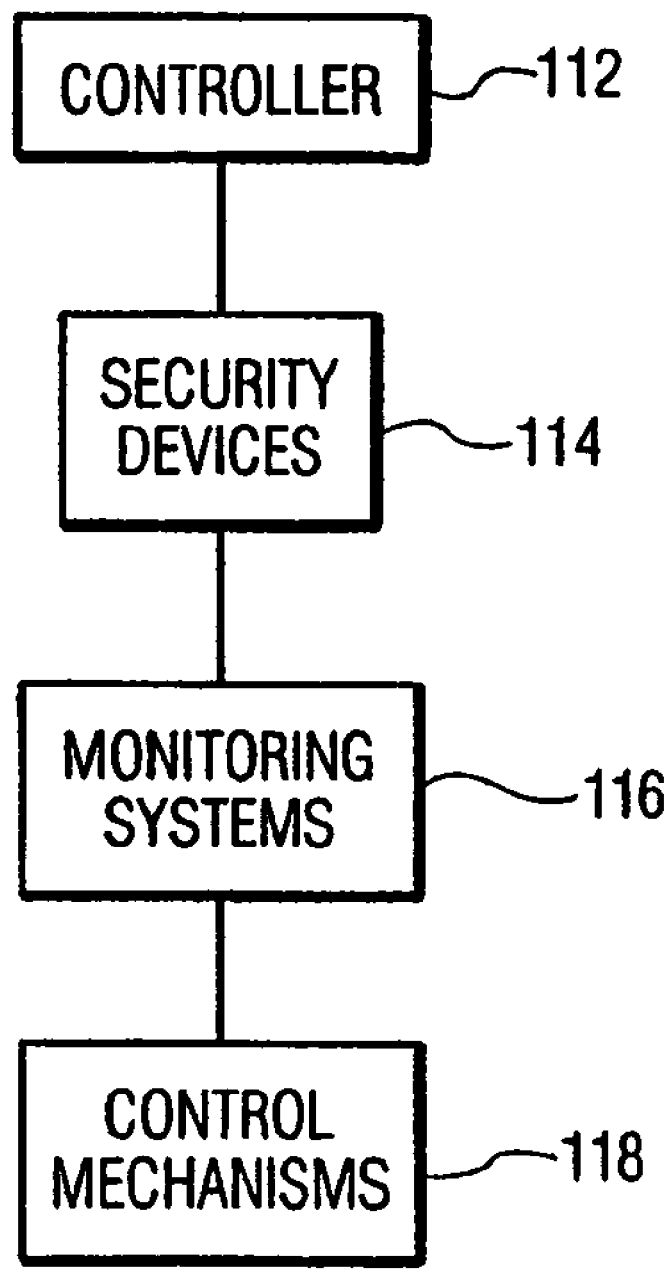
FIG. 1 is a block diagram of an embodiment of a security system in accordance with the present invention.

In accordance with embodiments of the present invention, apparatus, systems and methods are disclosed for restricting access to and the operation of an aircraft, vehicle or other device or system to only authorized personnel. In general, as shown in FIG. 1, for the purpose of restricting operation of the aircraft, a controller 112 is provided operable by a user, one or more security devices 114, such as biometric readers, is provided associated with the controller 112, one or more monitoring systems 116, such as a computer, is provided in communication with the security devices 114 and one or more control mechanisms 118 is provided in communication with the monitoring systems 116. Any desired biometric characteristics may be utilized for this purpose, such as, for example, fingerprint, retina, facial or DNA characteristics. The one or more biometric readers 114 may be utilized in a variety of different manners, such as being mounted on or integrated within the controller 112 or may be a separate device. The following illustrates exemplary embodiments adapted for aircraft use, such as airplanes or helicopters.

Figure 2:
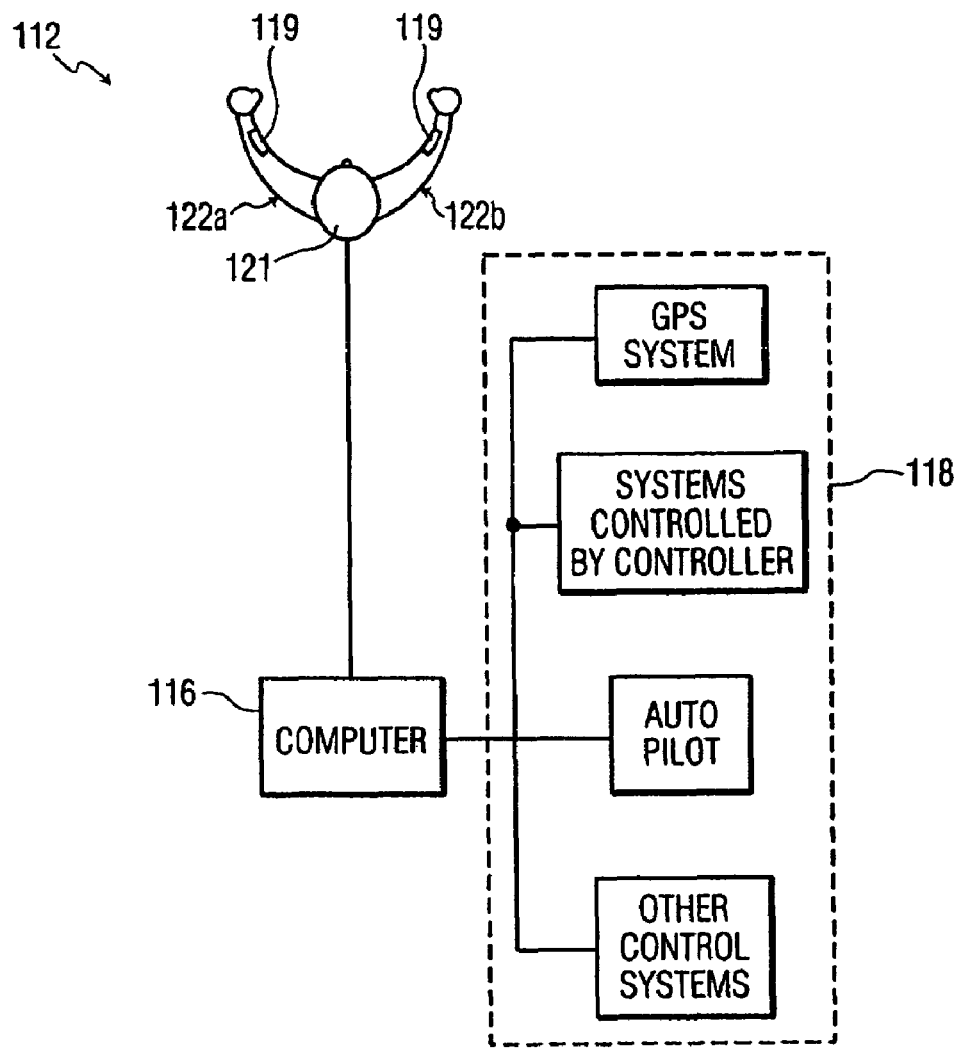
FIG. 2 is a partial schematic, partial block diagram of the system of FIG. 1.
Figure 3:
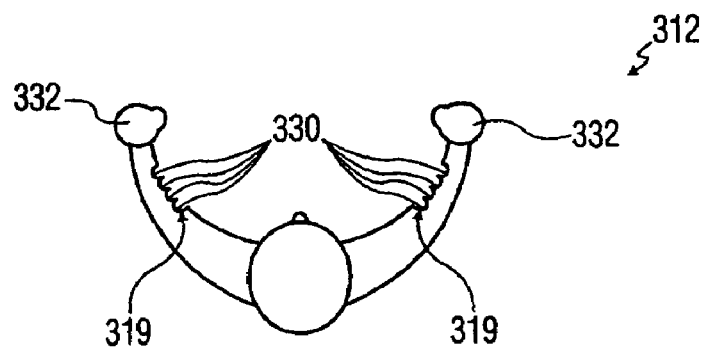
FIG. 3 is a further exemplary embodiment of a controller of FIG. 2.

FIG. 2 is a perspective view of an embodiment in which biometric readers in the form of fingerprint and retina readers 119 and 121, respectively, are associated with the control 112, i.e., the controller, of an aircraft. In one preferred embodiment, the fingerprint reader 119 is of a type that also incorporates a pulse sensor. In the embodiment shown, the fingerprint/pulse reader 119 may be provided on one or both of the control arms 122a and 122b. The retina reader 121 is shown provided centrally disposed between the two upright control arms 122a/122b. As should be understood, the fingerprint/pulse reader 119 and retina reader 121 may be utilized at other desired locations as well, such as the fingerprint/pulse reader 119 being associated with other components or the retina reader 121 mounted at other locations in the cockpit. The fingerprint/pulse reader 119 and retina reader 121 may be conventional devices, such as any commercially available components, or may be specially manufactured hardware and/or software where desired. Alternatively, as should be understood, other types of biometric sensors may be utilized where desired. In FIG. 3 is illustrated another exemplary embodiment of a control 312. In this embodiment, the fingerprint/pulse reader 319 comprises a series of four inward radius portions 330 shaped to accommodate a user's fingers and a thumb reader 332. The remaining portions are the same as that illustrated in FIG. 2. As should be understood, the control may comprise other shapes and configurations as well, and should not be construed as being limited to the designs shown in FIGS. 2 and 3; for example, a single straight arm, circular steering wheel type design, T-shaped , etc.

In addition, preferably the one or more monitoring systems 116, such as a computer illustrated in FIG. 2, is provided in communication with the fingerprint/pulse reader 119 and retina reader 121. The term "computer" as used herein should be broadly construed to comprise any device capable of receiving, transmitting, and/or using information, including, without limitation, a processor, a microprocessor, a personal computer, a network server, a distributed computing system involving parallel processes over a network, network computing or a mainframe.

As discussed above, the monitoring system 116 is also preferably in communication with one or more control mechanisms 118 on the aircraft, such as, for example, the control 112, any system controlled by the control 112, the auto-pilot control system, a Global Positioning System ("GPS"), such as a GPS chip, located on the aircraft and/or integrated within one or more biometric sensors, or any conventional systems on the aircraft, as examples. The monitoring system 116 may comprise the aircraft's existing on board computer system or may comprise a separate computer system located on the aircraft itself or at designated locations outside of the aircraft, such as an air traffic control center, which is in communication with the on board computer system or directly with the aircraft's security devices 114 and/or control mechanisms 118.

In addition, the monitoring system 116 may be programmed, such as by authorized personnel, so as to be responsive to data received from the fingerprint/pulse reader 119 and/or retina reader 121 in order to control specific operations of the aircraft, such as designated ones of the aircraft's control mechanisms 118. In some exemplary embodiments, the monitoring system 116 may be preprogrammed so as to grant designated personnel permission to operate the aircraft for specific tasks; for example, granting only the designated pilot and copilot of a certain flight the ability to fly the aircraft, granting designated crew the ability to turn off and/or on the aircraft beacon system, granting designated ground crew and maintenance personnel the ability to service the aircraft, etc. In this manner, different types of permissions may be granted where desired to different categories of personnel. Biometric sensors may be utilized wherever restrictions may be desired to operate the aircraft; for instance, biometric verification required to fly the aircraft, for operation of the beacon control system or for access into designated areas, for example, via a biometric interlock on doors, panels and/or hatches providing access to any area on the aircraft potentially vulnerable to sabotage, such as, for example, providing access onto the aircraft itself, into cockpit areas and/or for access to storage compartments, such as cargo areas underneath the aircraft, etc. In this and other embodiments, the GPS system may operate by sending positioning information to designated locations, such as ground control, in response to various occurrences on the aircraft, such as, for example, where unauthorized persons attempt to fly the plane, a plane goes off its normal course, etc. An exemplary application of this embodiment is illustrated in the accompanying flow chart of FIG. 4, which is described in greater detail below.

Figure 4:
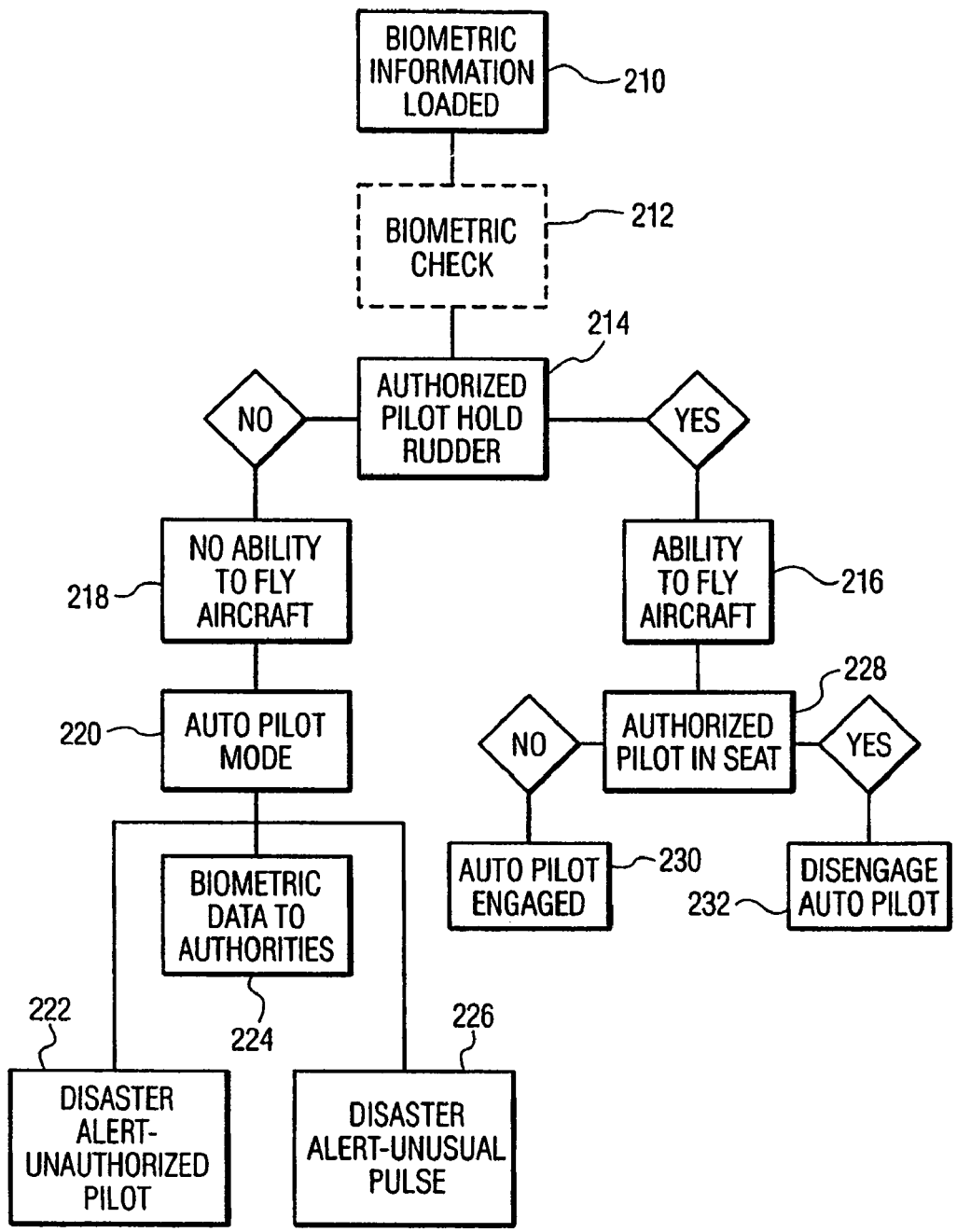
FIG. 4 is a block diagram of an exemplary application of the system of FIG. 1.

As shown at step 210 in FIG. 4, prior to flight, the pilots and crew that are pre-authorized have their fingerprint and retina biometric information loaded into the designated monitoring system 116, such as the airplane's on-board computer. As mentioned above, a separate computer system located on or outside of the aircraft may be utilized as well. The biometric data that is loaded may have been previously taken from the individuals and stored in a database in electronic form, which is then transferred to the plane computer. Alternatively, the biometric data to be loaded may be read from these individuals on site, such as at the time boarding occurs, and then loaded into the on-board computer system at that time. In addition, where desired, a separate biometric check may be performed to verify identity, such as taken from the pilots and crew prior to boarding the plane, such as a fingerprint check that may be compared against stored biometric data for the designated persons, as shown in dotted lines at step 212.

As shown at step 214, the pilot is required to hold the control 112, so that the pilot's fingerprint/pulse can be detected by the fingerprint/pulse reader 119 and communicated to the monitoring system 116 to verify identity. An authorized pilot will be able to fly the aircraft, as shown at step 216. Otherwise, as shown at step 218, the control 112 will not function properly and the individual will not be able to fly the plane; for example, in one embodiment, the monitoring system 116 will kick back to auto-pilot mode, as shown at step 220. The term "fly" as used herein should be broadly construed to refer to any phase of an aircraft flight, starting up of the aircraft, movement of the aircraft from a fixed position, take-off or landing of the aircraft, taxiing of the aircraft as well as in the air flight. Accordingly, in other exemplary embodiments, where the aircraft is on the ground, for instance, the monitoring system 116 may operate to prohibit takeoff where an unauthorized pilot is detected, for example, by failing to turn on engines, locking of the control 112, etc. Further, where an unauthorized person may place their hand on the control 112 in order to try to fly the airplane, the monitoring system 116 may also communicate that information to designated authorities, such as, for example, via an unauthorized pilot notification or a disaster alert signal sent to ground control, as shown at step 222. The monitoring system 116 may also at the same time send the unauthorized person's biometric data to designated authorities, as shown at step 224, so that a subsequent biometric check may be performed to uncover the identity of that individual. In this embodiment, the pulse sensor of the fingerprint/pulse reader 119 operates to detect further information about the condition of the individual holding the control 112, such as whether or not there is the presence of a pulse, to signify that the hand placed on the control is of a live individual, or if there is a rapid or irregular pulse, such as to signify that the individual is in a distressed state. The monitoring system 116 can be programmed to notify authorities, such as ground control, if any such unusual pulse reading occurs, such as, for example, via a distressed pilot notification or a disaster alert, as shown at step 226.

In addition, the retina reader 121 can also be used in this embodiment as an additional level of security, such as to communicate with the monitoring system 116 so as to authorize engagement or disengagement of the auto-pilot. For example, the retina reader 121 can verify whether an authorized pilot is in his or her seat, and control subsequent operations based that information, where desired, such as to allow disengagement of the auto-pilot, as shown at steps 228-232. Other suitable types of biometric devices may be utilized as well where desired in place of the retina reader 121; for example, a heat signature device or a camera located in the seat of the pilot rather than a retina reader. In certain embodiments, retina reader 121 can comprise one or more commercially available cameras adapted for taking a biometric read of the retina of designated persons at specified times. For example, the camera can of a type activated to take a biometric read anytime there is motion sensed. For instance, the camera can be mounted in the cockpit area and operated to take a retina read anytime there is movement by the pilot. In addition, that same camera, or another camera, can be provided to take a photograph of the designated person at the same time a retina read is taken. Multiple cameras may also be used where desired, such as for the pilot and copilot, etc. In addition, in this and other embodiments, the camera can also be activated so as to take a photograph of the designated persons at other desired times, such as when an unauthorized person attempts to take the controller or access particular areas, an irregular pulse is detected or any other distressed condition is detected. The photograph, along with any other desired information, may then be transmitted to desired locations, such as via satellite, cellular or independent transmitter, as examples. Some examples of the desired locations include, but area not limited to, the airlines, as mentioned above, the Department of Defense and/or Department of Homeland Security.

In some embodiments, it may be desired to grant permission to certain additional persons as a matter of course or in emergency situations to have limited or full authority to operate the aircraft who originally did not have that authority. For instance, in certain circumstances, for example, such as where any crew become ill or incapacitated during a flight, it may be desired that authority to operate a given aircraft be granted to additional persons, such as any off duty crew or any passenger pilots on the aircraft. In such situations, a biometric check can be implemented to verify identity of the additional persons before any authority to operate the aircraft will be given. The biometric check can be performed on the aircraft and compared against stored biometric information contained either on the aircraft, such as contained in the on-board computer, or any database located outside of the aircraft, such as a database kept by designated authorities, such as by individual airlines, the airline industry or a central reporting database, as examples. The biometric check can be done by utilizing a separate biometric device on the aircraft, or by using any of the existing biometric devices mentioned above, such as the fingerprint/pulse reader 119 and/or retina reader 121.

In some embodiments, a flight management system (FMS) or a remote station can monitor the progress of the aircraft's flight, using, for example, altitude, course and GPS data. The FMS can be a computer system provided as part of the monitoring system 116, integrated therewith, or independent therefrom. The FMS can compare data relating to the flight's progress with a flight plan that has been pre-recorded in memory. In such embodiments, the FMS, monitoring system or remote station can alert ground controllers or other authorities to deviations from the flight plan for corrective measures, or the FMS can assume automated control of the aircraft to prevent the flight from entering prohibited or restricted air space or if a possibly hostile situation is detected.

Figure 5:
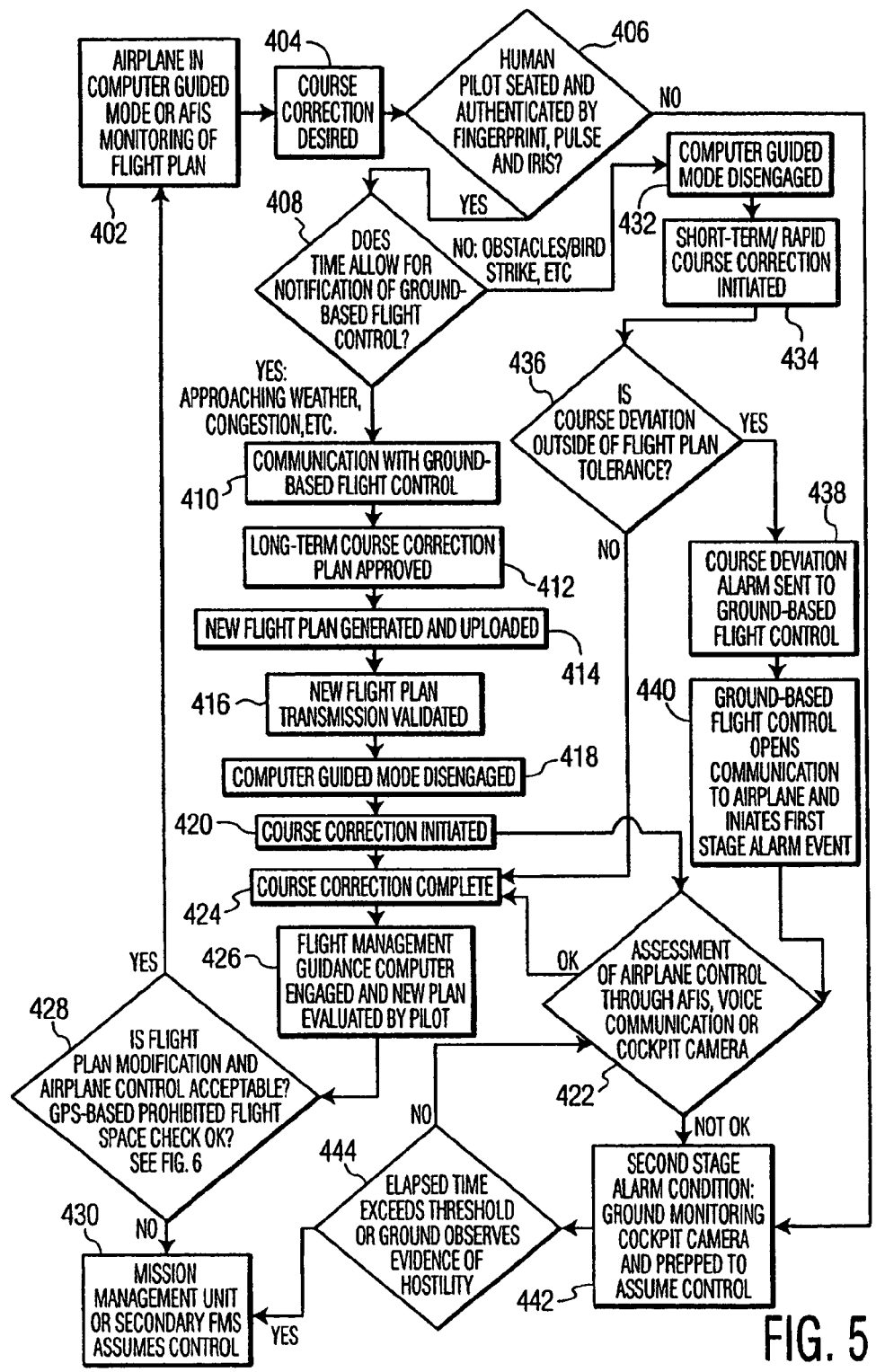
FIG. 5 is a flowchart showing a method of safely operating an aircraft according to an embodiment of the invention.

FIG. 5 is a flow chart showing how such a system can operate. Box 402 represents the status of a flight in computer-guided mode, e.g., with the auto-pilot engaged, or a flight being monitored by ground control through an airborne flight information system (AFIS). The AFIS provides communication between the aircraft and ground controllers so that the flight plan can be monitored remotely. The AFIS can be configured to automatically transmit flight-related data, such as course, altitude and position, and information received from the monitoring system 116 to ground controllers or other authority, and can receive instructions therefrom without pilot or crew interaction.

During flight operations, a course correction or deviation from the flight plan may be desired for a number of reasons, such as the approach of inclement weather, flight traffic congestion, an obstacle in the flight path or a bird strike. When a course correction is desired, such as at box 404, the next step of the method will depend upon whether or not an authorized pilot is at the controller 112 of the aircraft. As shown at step 406, the biometric readers 114, such as the fingerprint/pulse readers 119 retina reader 121 described above, can be utilized to determine if an authorized pilot is at the controller 112.

If an authorized pilot is at the controller 112, a decision 408 must be made as to whether there is adequate time for notification of the proposed course correction to ground controllers. If there is sufficient time to notify ground control of the proposed course correction, the ground controllers can be notified, as in step 410. If the proposed course correction is found to be suitable by the ground controller, the course correction plan can be approved, as at step 412, and a new flight plan generated and uploaded to the aircraft, as shown at step 414. After the new flight plan has been validated at step 416, the computer guided flight mode (if engaged) can be disengaged as at step 418. The approved course correction can then be initiated, as at step 420, by the pilot.

While the course correction is being executed, ground controllers can assess control of the aircraft through data received from the AFIS, through voice communication with the pilot and/or through the cockpit camera as at step 422. Assessment of the state of control of the aircraft can include an evaluation of whether an authorized pilot is in command, or if an unauthorized and potentially hostile individual may have seized control of the aircraft. The data received from the AFIS that can be used as part of the assessment can include information communicated from the security devices 114, such as fingerprint/pulse readers 119 and retina readers 121. Where a possibly hostile situation can not be ruled out, a potential threat can be assumed as explained below.

If the state of control of the aircraft appears to be acceptable, as shown at step 424, the auto-pilot (the flight management guidance computer) can be engaged or re-engaged when the correction has been completed, and the new flight plan can be evaluated by the pilot as shown in step 426. At step 428, the modified flight plan and the control of the airplane can be evaluated by the ground controller, other authority and/or monitoring system 116. This step can include an evaluation of whether the new flight plan will bring the aircraft unacceptably close to any prohibited or restricted airspace, such as, for example and without limitation, power generating plants, such as nuclear plants, military installations, government areas, such as the Capital and White House, and national monuments. Prohibited airspace evaluation can be performed in accordance with the method described below in connection with FIG. 6. If the modified flight plan is found to be acceptable, the aircraft can resume normal operations as shown in box 402.

If the ground controller or other authority finds the progress of the flight, the new flight plan or the control of the airplane to be unacceptable, control of the aircraft can be assumed from the ground or other location remote from the aircraft, such as a chase plane. Alternatively, control of the aircraft can be assumed by an automated system on board the aircraft. In either case, control of the aircraft is at least partially taken away from the pilot, as at step 430. Control of the aircraft can be assumed using a variety of different means. Examples of such means include the provision of a Mission Management Unit (MMU) or a secondary FMS. A MMU is a control system that allows ground controllers to override the on-board FMS and aircraft control systems in order to command the aircraft from the ground through radio or satellite communications. A secondary FMS can be pre-programmed with an unalterable flight plan or an alternative contingent flight plan that can be activated in the event of an airborne hostile event. When the secondary FMS is engaged, it can override any commands or control, or selected commands, attempted by the pilot or unauthorized user. The unalterable flight plan can be hard-programmed into the secondary FMS with instructions to fly the aircraft to a pre-selected safe altitude or location. Assumption of aircraft control can be assumed by a MMU, secondary FMS or other control device anytime a hostile event is suspected.

Other scenarios in which aircraft control can be assumed from the ground, another location remote from the aircraft, or by a secondary FMS is if an authorized pilot is not detected at step 406, or if it is determined at step 408 that there is not adequate time to notify ground controllers of a desired course correction and other conditions are met. If there is no time to notify ground controllers at step 408, such as if an obstacle is detected in the flight path or in the event of a bird strike, the auto-pilot (if engaged) can be disengaged at step 432 and short term course correction can be immediately initiated by the pilot at step 434.

Following any course correction, it can be determined whether the course deviation is within the tolerance of the flight plan at step 436. As such, the FMS or monitoring system 116 can be preprogrammed with acceptable tolerances or be able to calculate tolerances based on the particular situation. Tolerances of greater magnitude may be acceptable where the aircraft is in transoceanic flight or is otherwise not near any potential terrorist targets. Lesser tolerances may be appropriate where the flight path takes the aircraft near restricted air space or other areas that may contain potential terrorist targets. If it is determined that a course deviation is within flight plan tolerance, then the course correction can be considered to be complete and the method resumed at step 424.

If at step 436 it is found that the course deviation is not within flight plan tolerance, an alarm can be sent to the ground controller, such as by the AFIS, as shown in box 438. Such an alarm can be considered a first stage alarm event or alert condition. Upon declaration of a first stage alarm, the ground controller can attempt to initiate communication with the aircraft and assess the status of the flight, including the state of control of the aircraft through the AFIS, voice communication and/or the cockpit camera, as in step 422. If, after the assessment step 422, it is determined that a hostile event may be in progress, a second stage alarm or condition event can be declared. As shown in step 442, a second stage alarm event can be accompanied by continuous monitoring of the cockpit camera and preparation by ground control or another authority to assume control of the aircraft.

An elapsed time period threshold can be established for second stage alarm events. If, at step 444, ground controllers determine that a hostile event is not occurring, the second stage alarm condition can be cancelled and the ground controllers can re-assess control of the aircraft according to step 422. However, if ground controllers observe evidence of hostile activity, or if the threshold time to make a determination is exceeded, the ground controller or other authority can assume control of the aircraft via the MMU, or the secondary FMS can assume control.

If a course correction is desired and, at step 406, it is determined that an authorized pilot is not in control of the aircraft, a second stage alarm condition can be immediately declared and the method carried out directly from step 442.

Figure 6:
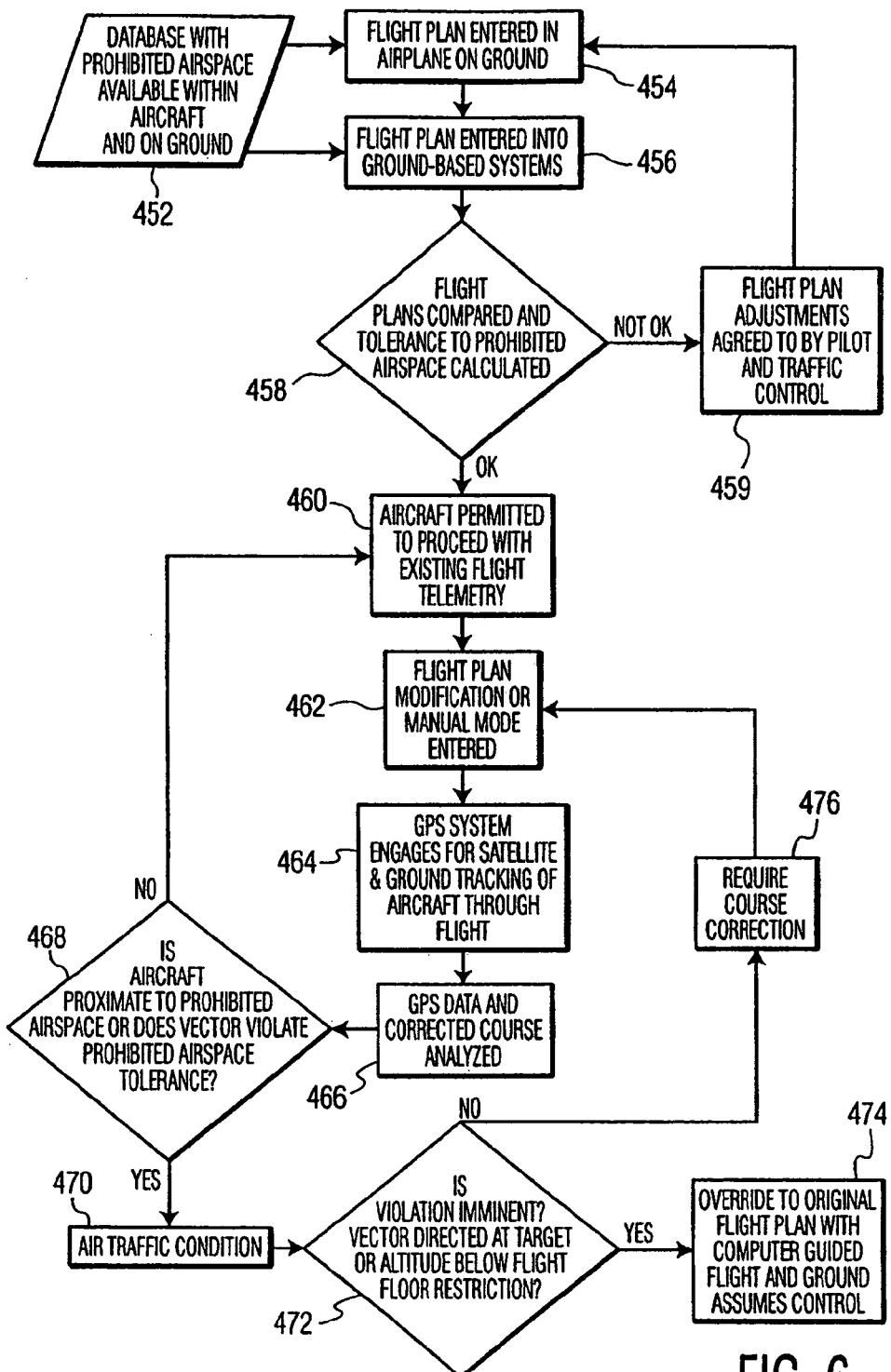
FIG. 6 is a flowchart representing a method of avoiding prohibited airspace according to an embodiment of the invention.

FIG. 6 shows a method of preventing an aircraft from entering restricted or prohibited airspace according to some embodiments of the invention. As shown in step 452, a database having information relating to prohibited airspace can be loaded into a computer on the aircraft, such as the FMS, and can also be available to ground controllers or other authorities on the ground. The flight plan for the aircraft can be loaded into the aircraft computers prior to departure (or subsequently uploaded as in step 414 of FIG. 5). The flight plan can be entered into the ground based systems as shown in step 456. At step 458, the flight plan can be compared with the prohibited-airspace database to ascertain whether or not the flight plan will bring the aircraft too close to or within prohibited airspace. In addition, acceptable tolerances to the flight plan can be calculated based on proximity to prohibited airspace, the nature of the prohibited airspace and other factors. If it is determined that prohibited airspace may be violated, or if there are other concerns regarding the flight plan, the pilot and the ground controllers can agree to adjust the flight plan at step 459 as appropriate.

If adjustments to the flight plan are made, the adjusted flight plan can be reentered into the aircraft and ground-based computer systems at steps 454 and 456. Thereafter, the analysis of step 458 can be repeated as many times as necessary.

If at step 458 it is determined that the flight plan is acceptable, the aircraft is permitted to proceed under the flight plan at step 460. If it is desired to adjust the flight plan en route or otherwise make course corrections, such as those described above in connection with step 404, the modification can be entered into the guidance computer or manual (pilot) control can be assumed as shown in box 462. When modifications to the flight plan are made or if manual flying mode (i.e., the auto-pilot turned off) is initiated, the GPS system onboard the aircraft can be used for satellite and ground tracking of the flight's progress at step 464. The GPS data, other data communicated through the AFIS, and the modified flight plan can then be analyzed at step 466 to determine whether the aircraft is proximate to prohibited airspace or if the flight plan, as modified, includes a vector that would violate prohibited airspace tolerance. If, at step 468, it is determined that the aircraft is not proximate to prohibited airspace and that the flight plan includes no vectors that would violate prohibited airspace tolerance, the aircraft is permitted to proceed with existing flight telemetry as shown at box 460.

If at box 468 it is determined that the aircraft is proximate to prohibited airspace or a flight plan vector would violate prohibited airspace tolerance, then an alarm condition can be declared, as at box 470. Under the alarm condition, it can be determined whether a prohibited airspace violation is imminent. A violation may be imminent, for example, if the aircraft vector is directed at a potential terrorist target or if the altitude of the aircraft falls below a pre-selected flight floor restriction as shown at step 472. If it is determined that a prohibited airspace violation may be imminent, the modified flight plan can be overridden and automatically replaced with the original flight plan or with a contingent flight plan as shown at box 474. As discussed above in connection with step 430 of FIG. 5, the ground controller can assume command of the aircraft via the MMU or the secondary FMS can assume control in order to override the modified flight plan.

If at step 472 it is determined that no violation of prohibited airspace is imminent, it may not be necessary to immediately assume control of the aircraft via an MMU or secondary FMS unit. Instead, a course correction can be required so that the aircraft is no longer proximate to prohibited airspace or so that the flight plan includes no vectors that would violate prohibited airspace, as shown at step 476. Once a suitable course correction has been determined, the flight plan should again be modified and entered into the computer in accordance with step 462. The flight can then be permitted to proceed according to the modified plan and the subsequent steps of the method.

As noted above, some embodiments of the invention relate to methods of limiting access to the aircraft by passengers and unauthorized crew to further enhance safety. The methods of limiting access will now be described in more detail in connection with FIGS. 7 through 10. The methods can involve establishing one or more databases of passenger and flight staff information, including biometric information. The appropriate information for each individual that is to have access to the aircraft can be transmitted from the database to the aircraft and ground systems. Individuals requesting access to the aircraft can be identified at one or more access points, such as the aircraft door or gate, prior to accessing the aircraft. Security devices, such as biometric readers 119, 121 described above and/or smartcard or name badge scanners, can be provided at the access point to identify individuals. Access to the aircraft can therefore be limited to individuals who are pre-approved for access.

Figure 7:
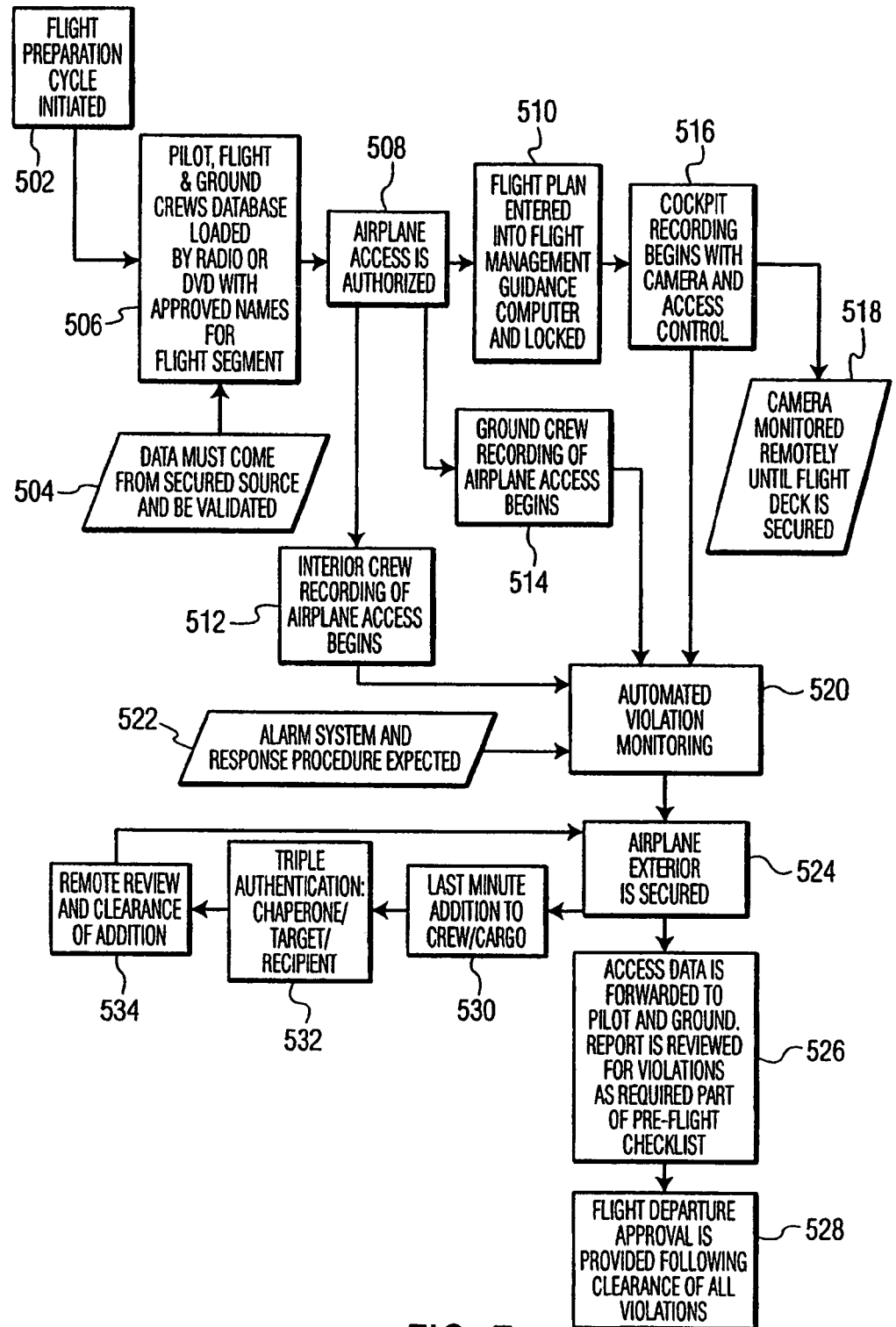
FIG. 7 is a flowchart representing a method of limiting and recording access to an aircraft prior to takeoff.

FIG. 7 is a flow chart showing an overview of a method for limiting pre-departure access. As shown in step 502, the flight preparation cycle can be initiated prior to any crew member or passenger accessing the airplane. The identities and related information for members of the flight crew and ground crew are recorded in a secure data source and validated, as discussed in more detail below. The data shown at box 504 can include appropriate biometric information and data encoded on a smartcard or name badge in possesion of the crew for identifying the individual when necessary.

The identities of the crew members assigned to the particular flight and their associated biometric information and/or smartcard data can be loaded to the aircraft computers and ground systems by radio, DVD or any other secure electronic means at step 506. This limited data subset of authorized individuals can be accessed when any individual requests access to the aircraft. If, after biometric scanning, smartcard reading and/or other secure identification process, the crew members are confirmed to be the appropriate crew members for that flight, access to the aircraft is authorized as shown in step 508. As shown in step 510, the flight plan can also be entered into a flight management guidance computer and/or into the monitoring system 116.

Once individual crew members are authorized, access by the interior crew and ground crew can be recorded at steps 512 and 514. The cockpit camera, access control devices or other recording devices can also begin recording access to the cockpit. In addition to recording of cockpit activity, the image from the cockpit camera can be monitored remotely in real time by ground personnel until the flight deck has been secured. Flight deck activity recording and monitoring are shown in boxes 516 and 518.

While access to the aircraft is being monitored and recorded, automated violation monitoring can be performed as shown at box 520. Such monitoring can include monitoring of compartments or hatches that should not be accessed and tracking of crew members to make sure that an individual does not access areas for which that individual is not authorized. If the automated monitoring detects any possible violations, an alarm can be declared and appropriate response procedures initiated as at step 522.

A similar database of passenger information and system for passenger authentication can be established if desired. Once crew members and passengers have boarded the plane, the airplane exterior can be secured, as shown at step 524, and a preflight checklist can be performed, as at step 526. As part of the preflight checklist, access data can be sent to the pilot and/or ground personnel. This report can be reviewed as part of the preflight checklist for any unauthorized access to the aircraft, or any other violations that may have occurred during flight preparation. If any violations have occurred, the nature of the violation can be investigated and cleared prior to providing approval for flight departure, as at Step 528.

At times it is necessary to make last minute changes to the crew, passengers or cargo onboard the aircraft. If a last minute change is necessary, as shown in box 530, authentication of the added person or cargo can be performed at step 532. In this regard, triple authentication can be performed using biometric readings of the newly added person or cargo, the person bringing that newly added person or cargo to the aircraft, as well as the person allowing the newly added person or cargo access to the aircraft. In addition to this triple authentication, remote approval (from ground personnel) can be obtained prior to allowing the newly added person or cargo access to the aircraft, as represented by box 534. Once any last minute additions to the crew, cargo or passengers have been completed, the aircraft exterior can again be secured in accordance with step 524 and a new report generated and reviewed as part of the preflight checklist.

Figure 8:
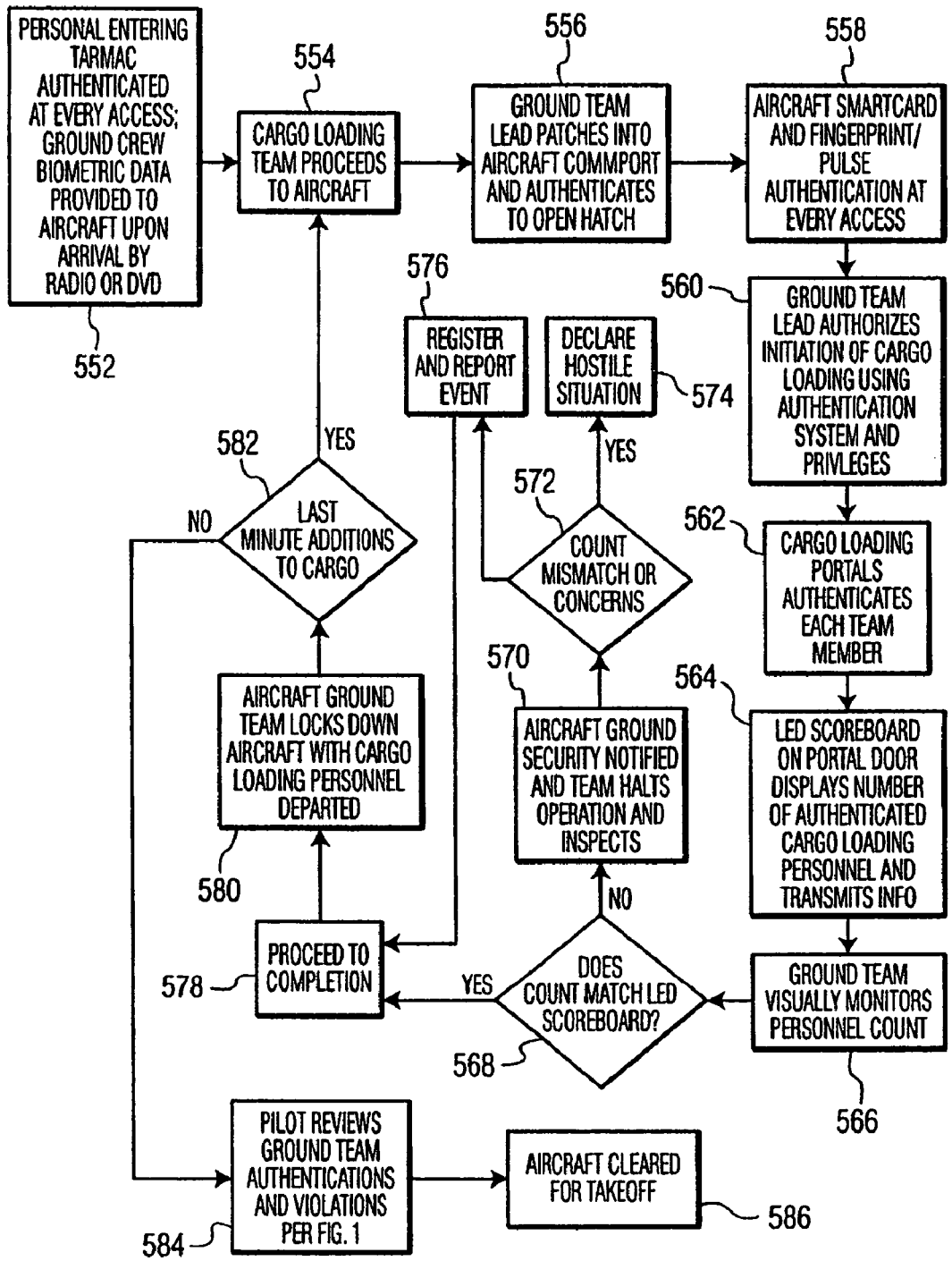
FIG. 8 is a flowchart representing a method of loading cargo onto an aircraft according to an embodiment of the invention.

Access to the aircraft by ground crew and cargo loading personnel can be limited according to the method shown in FIG. 8. As discussed above, identity and biometric data of all personnel who are authorized to have access to the aircraft is downloaded from a secure data source. As shown in box 552, access to the entire tarmac can be limited to those ground crew members having authorization to access at least one aircraft on the tarmac. Therefore, ground crew members can undergo biometric scanning prior to being permitted on the tarmac. Once permitted on the tarmac, the cargo loading team can proceed to the aircraft to which they are assigned, as shown in box 554. The ground team gains access to the aircraft when a member of the ground team, such as the Ground Team Lead, patches into an aircraft commport and authenticates his or her identity. Authentication, represented by Box 556, can be performed using a name badge or smartcard with encoded identifying data, and/or using fingerprint/pulse authentication or retina scanning at security devices provided at the commport. The authentication of the Ground Team Lead or other ground crew member can open an electronic lock to allow access through one or more cargo hatches on the aircraft. Thereafter, the Ground Team Lead can authorize the loading of cargo, and the remainder of the ground crew can be authenticated using smart cards or biometric reading each time a ground crew member accesses the aircraft, as shown at boxes 558-562.

As shown at box 564, an electronic display, such as an LED scoreboard, can be provided on or near a portal door at the aircraft. The electronic display can display the number of cargo loading personnel that have been authenticated and are authorized to load cargo onto the aircraft. This information can be transmitted to or monitored by a member of the ground team, who can visually observe the number of personnel loading cargo, as shown in box 566. If at step 568 it is determined that the number of personnel visually counted does not match the number displayed on the electronic display, security personnel can be notified and the loading operation interrupted. As shown at box 570, the cargo loaded onto the plane can then be inspected. Further, as shown at step 572, it can be determined which personnel on or near the aircraft are not authenticated, or which authenticated personnel are missing. If it is determined that an unauthorized individual has accessed the aircraft or the cargo being loaded onto the aircraft, a hostile situation can be declared as at step 574 and an appropriate response initiated. If it is determined that no unauthorized personnel have accessed the aircraft and that no hostile situation is occurring, a report can be made as at box 576 and the loading process completed as shown at box 578. Once cargo loading is complete and the loading personnel have departed, the ground team can lock down the aircraft as shown at box 580.

Provided that there are no last minute additions to cargo, the report regarding ground team authentications and any violations can be sent to the pilot for review as part of the pre-flight checklist as shown at box 584 and discussed above. Thereafter, the aircraft can be cleared for takeoff as shown at box 586. If at step 582, additional cargo must be loaded onto the aircraft, the cargo loading team can proceed back to the aircraft and reinitiate the method starting at step 554.

Figure 9:
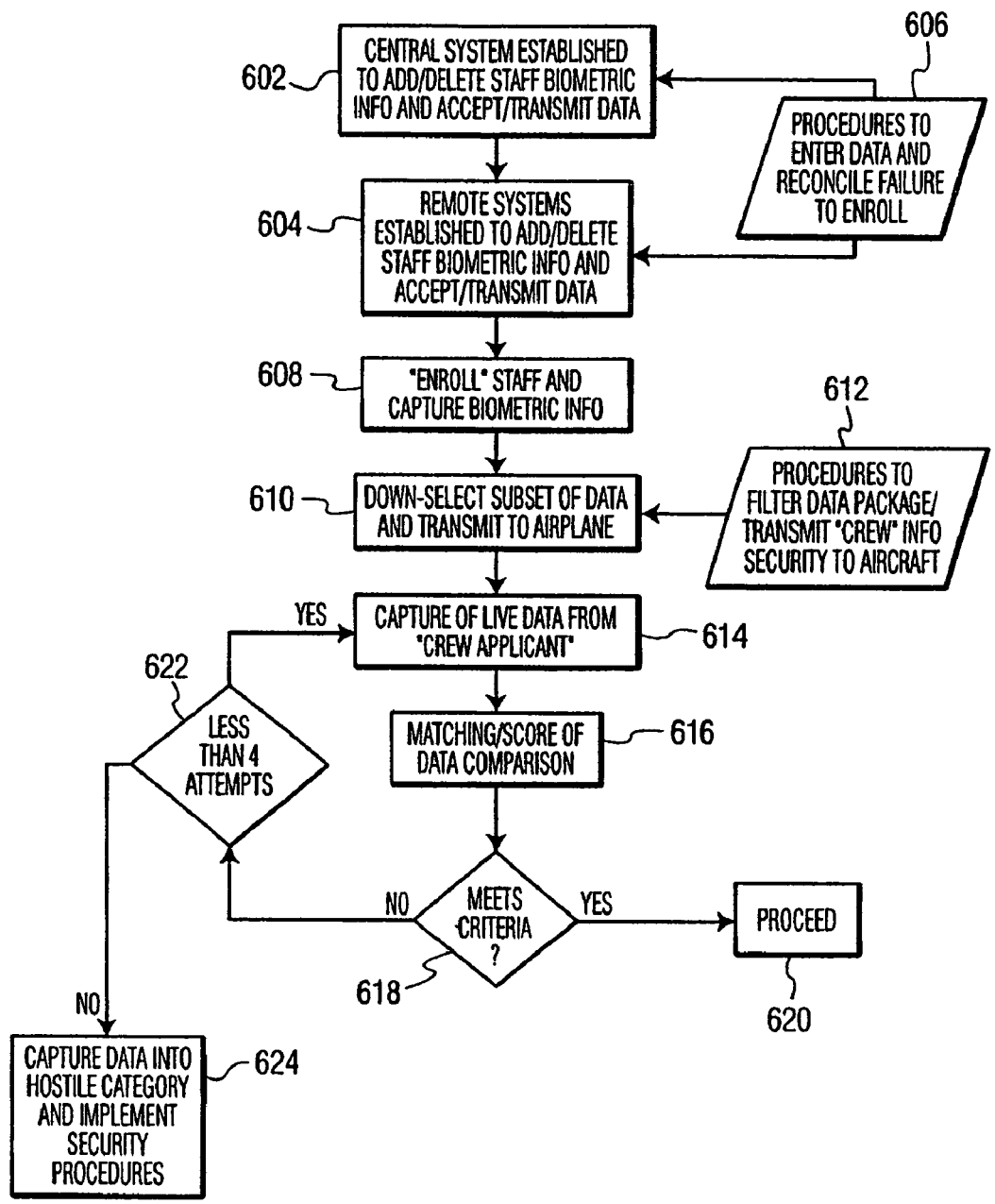
FIG. 9 is a flowchart representing a method of authenticating individuals prior to permitting access to an aircraft according to an embodiment of the invention.

A method of authenticating authorized personnel is shown in more detail in FIG. 9. As noted above and indicated at box 602, a central system is established to maintain identity and biometric information regarding personnel. The central system includes the ability to add biometric information for new staff members and to delete information with regard to terminated staff members. Further, the central system should be configured so as to accept and transmit data to and from remote systems. These remote systems, as shown at box 604, can be provided with the capabilities to add and delete identifying and biometric information regarding staff, and to accept and transmit data from and to the central system.

At step 606, procedures can be established to safeguard the data. For example, privileges to enter, modify and delete data can be restricted to personnel who have pre-selected security clearance. Background checks can be performed on each new staff member to be added to the system. Biometric information for new staff can be captured using fingerprint/pulse readers and/or retina readers as described above. These procedures can be used to enroll staff by capturing each individual's biometric information, and adding that information to the database in association with the staff member's identity, identifying information encoded on the staff member's name badge or smartcard, and other information of interest.

If cockpit crews, cabin crews and service crews are selected for a particular aircraft or flight, the information for that flight can be downloaded to the aircraft at the appropriate time, as shown at box 610. As indicated by box 612, procedures can be established to ensure that only information for the appropriate crew members (i.e., those actually assigned to the particular flight) are downloaded to the aircraft. Therefore, staff members who are not assigned to that particular flight will not be able to authenticate or otherwise gain access to the aircraft. The transmission of the crew information should be performed using secure network protocols or other means for secure data transfer as shown at box 612.

When a staff member attempts to access the aircraft, biometric information of that staff member is captured using appropriate biometric reading devices, as at step 614, using the methods and apparatus described above. At step 616, the newly captured biometric information is compared to the biometric information downloaded to the aircraft from the secure database. The comparison of the biometric information of the individual requesting access and the downloaded information for the appropriate individual can be used to generate a score to determine whether or not there is a match as shown at 618. The score can be based on the number of common identifying points from a fingerprint comparison, common identifying features from the retina reads or other identifying characteristics. A comparison resulting in a score above a pre-selected threshold can be considered a match. In addition, the individual's name badge or smartcard can be scanned to read identifying information encoded thereon for comparison with that downloaded from the database. If a match is determined, the individual staff member is authenticated and is permitted to proceed with access to the aircraft, as at box 620.

If it is determined that there is not a match between the biometric information or smartcard data of the individual requesting access and the downloaded data, the individual's biometric information can be re-read a pre-selected number of times. For example, as shown at box 622, if an individual staff member is permitted four scans, and the fourth scan does not produce a match, the individual can be considered potentially hostile. In that case, security procedures can be implemented as shown at box 624 and the individual's biometric information can be provided to security personnel or an appropriate authority. Where four scans are permitted and the individual has been scanned less than four times, the individual's biometric information can be re-read at step 614.

Figure 10:
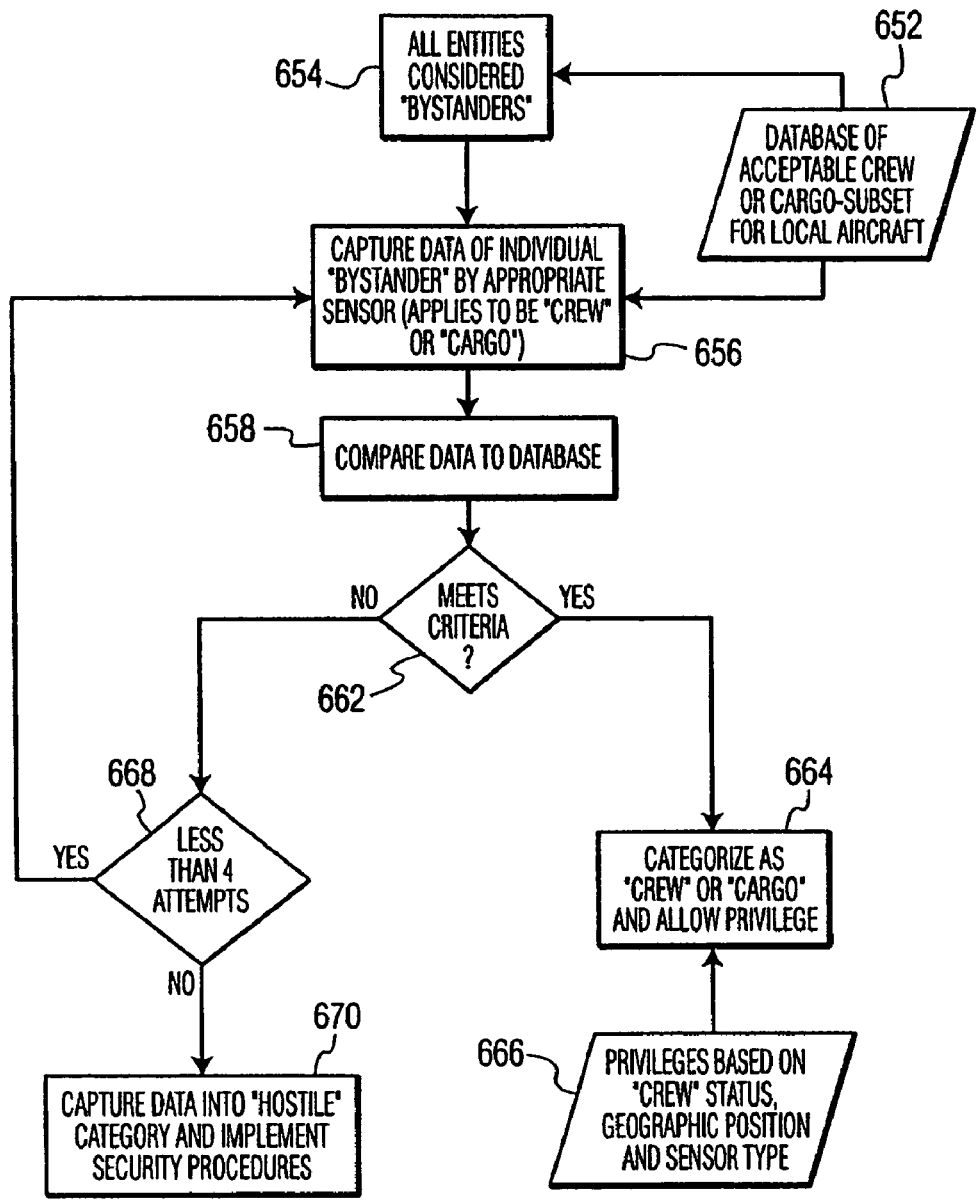
FIG. 10 is a flowchart representing a method of categorizing individuals who are requesting access to an aircraft or a portion of an aircraft according to an embodiment of the invention.

FIG. 10 shows a method of categorizing all individuals who are seeking access to an aircraft. At box 652, a database is provided having the identities and associated biometric information for aircraft crew and passengers. A subset of this data can be limited to only the crew members assigned to the flight and the passengers expected to be on the flight. The limited subset of expected individuals can be downloaded to the aircraft. (The word "cargo" in FIG. 10 is used to mean passengers when the method is being used to differentiate or categorize individuals requesting access to the aircraft.)

The method begins at step 654 by considering all individuals to be "bystanders". The biometric information for each of these individuals is read and captured by one of the appropriate means described above. Once biometric information has been scanned at steps 656, the scanned information is then compared to the information contained in the database at step 658. If, at step 662, the individual's newly scanned information meets the criteria for a match with that contained in the database, that individual is then categorized as "crew" or "passenger," as shown at box 664. Smartcards or name badges can also be scanned and compared to database information for additional security. Once appropriately categorized, the individual can be given privileges based on the assigned category, such as access to the appropriate areas of the aircraft.

For example, passengers can be given access to the passenger cabin; whereas crew members can be given access to their appropriate work areas. It is also possible, as shown at step 666, to provide an individual with access privileges based on predefined crew status, geographic position or sensor type.

If at step 662 it is determined that the individual's newly scanned data does not meet the criteria for a match with information contained in the database, the individual's biometric information can be re-scanned a pre-selected number of times. For example, if an individual is to be permitted four attempts at a successful scan, as shown at box 668, and the fourth attempt fails, the individual can be considered potentially hostile and the newly scanned data can be captured. In that case, security procedures can be implemented as shown at box 670 and the newly scanned biometric information can be provided to the appropriate authorities. If, after scanning less than four times, the individual's newly scanned biometric information does not meet the criteria for a match, the individual can be re-scanned at step 656. Thus, a method for categorizing individuals and providing the appropriate access to an aircraft is provided.

If circumstances warrant, it is also possible to use the method to re-categorize individuals after boarding the aircraft. An example of such a circumstance may be that discussed above with regard to granting privileges to an off-duty pilot in an emergency or if a crew member falls ill. In that instance, smartcard or biometric information can be uploaded to the aircraft via radio or satellite communications from the central or a remote database. Thereafter, the passenger can be re-scanned using biometric readers or smartcard scanners onboard the aircraft for authentication and upgrading to crew status. In such circumstances, any passenger who attempts to upgrade to crew status and fails authentication can be considered hostile.

As should be understood, the embodiments discussed above can be susceptible to many different modifications or variations. For example, it should be understood that any number of security devices may be used in connection with embodiments of the present invention, and with any number being biometric readers. For instance, in the illustrated embodiment, one or more biometric readers may be utilized where desired, and the biometric readers may be of any desired type, such as a fingerprint/pulse reader and/or retina reader as shown or any other desired types of biometric reading devices. In addition, in certain embodiments, it may be desired that there be a combination of biometric and nonbiometric type security devices, or that no biometric type security devices be used. In addition, the term "controller" as used herein should be broadly construed to comprise any mechanism utilized for operation of the aircraft, such as the control yoke, as well as any suitable type of device, system or method for regulating operation, such as a control of any desired shape, as mentioned above, a keyboard, trigger, buttons, tracking ball, single or dual joystick, lever, wheel, etc. Further, while the illustrated embodiment is described in relation to aircraft, it should be understood that embodiments may also comprise other types of apparatus or systems as well, including vehicles, such as, for example, military vehicles, commercial vehicles(e.g., trains, buses, trucks, taxi cabs, etc), private vehicles(e.g. passenger cars), or any desired products or equipment, such as controls for nuclear reactors or military weapons, computer terminals, firearms, etc. The embodiments of the present invention may be implemented using hardware or software or any combination of the two where desired. Various embodiments may also be implemented using commercially available technology. Accordingly, it is intended that the invention not be limited to the specific illustrative embodiments, but be interpreted within the full spirit and scope of the appended claims and their equivalents.

What is claimed is:

1. A method of limiting access to an aircraft comprising:
   maintaining a database having identity and associated biometric information relating to crew members;
   assigning at least one category to a group of crew members, the category based upon the job title of the crew members;
   designating access to certain areas of the aircraft to only particular categories of crew members only if an emergency situation arises;
   loading the category information to the database;
   downloading the category information to the aircraft;
   downloading the designated access information to the aircraft;
   downloading a subset of information from the database to the aircraft, the subset consisting essentially of information relating to crew members that are assigned to the aircraft for a particular flight;
   reading biometric information of an individual requesting access to the aircraft;
   comparing the biometric information read from the individual requesting access to the information downloaded to the aircraft to determine if there is a match;
   if a match is determined, determining a category of the individual requesting access to the aircraft, granting the individual access to only the areas of the aircraft to which the category is designated;
   if no match is determined, denying the individual access to the aircraft, generating a report that includes the individual's biometric information and information relating to the aircraft access attempt and providing the report to at least one of a crew member and ground personnel for immediate investigation of the access violation;
   preparing a preflight report relating to aircraft access attempts, the preflight report comprising any access violations to one or more areas of the aircraft, and reviewing the preflight report as part of a preflight checklist; and
   providing the individual's biometric information to security personnel.

2. The method of claim 1 further comprising the step of remotely monitoring the cockpit until the cockpit is secured and remotely monitoring at least one storage compartment.

3. The method of claim 1 further comprising the step of securing the exterior of the aircraft after passengers, crew and cargo is aboard the aircraft.

4. The method of claim 3 wherein if an additional crew member, passenger, or cargo is to be added to the aircraft after the exterior of the aircraft has been secured, the method further comprises the step of triple authenticating the additional crew member, passenger, or cargo.

5. The method of claim 4 wherein the step of triple authenticating comprises the steps of reading biometric information of the newly added crew member, passenger or cargo, the person bringing that newly added crew member, passenger or cargo to the aircraft, and the person allowing the newly added person or cargo access to the aircraft.

6. The method of claim 4 further comprising the step of preparing a report relating to aircraft access, including any access violations, and reviewing the report as part of a preflight checklist.

7. The method of claim 6 further comprising the steps of:
   updating the report after an additional crew member, passenger, or cargo is added to the aircraft after the exterior of the aircraft has been secured; and reviewing the updated report as part of the preflight checklist.

8. The method of claim 7 further comprising the step of granting departure approval after clearing any access violations noted in the report.

9. A method of claim 1 comprising, if no match is determined, reading biometric information of an individual requesting access to the aircraft, comparing the biometric information read from the individual requesting access and determining whether there is a match, before the generating a report step.

10. A method of claim 1 further comprising:
flying the aircraft if there are no access violations on the preflight report;
reading biometric information of an individual requesting access to a designated area of the aircraft;
determining the category of the individual requesting access to a designated area of the aircraft;
comparing the category of the individual against the area of the aircraft to which the individual is requesting access;
granting the individual access to the area of the aircraft if the area is designated to the individual's category;
denying the individual access to the area of the aircraft if area is not designated to the individual's category, generating a report that includes the individual's biometric information and information relating to the aircraft access attempt and providing the report to at least one of a crew member and ground personnel for immediate investigation of the access violation and providing the individuals biometric information to security personnel.

11. The method of claim 1 further comprising the step of monitoring any access violations with automated means.

12. The method of claim 11 further comprising the steps of declaring an alarm and initiating a response if the automated means detects an access violation.

13. A method of claim 1, further comprising the step of reading a crew member's fingerprint, pulse, retina, facial or DNA characteristics and loading information obtained into the database before the maintaining step and reading a crew member's fingerprint, pulse, retina, facial or DNA characteristics as part of the reading biometric information step.

14. A method of claim 13 further comprising the step of comparing the pulse provided before the maintaining step against the pulse provided as part of the reading biometric information step to determine if the pulse is irregular and if the pulse is irregular, invoking the steps wherein no match is determined.

15. A method of claim 13 wherein the comparing step comprises comparing each of the biometric information obtained before the maintaining step against each of the biometric information obtained at the reading step and generating a score based upon how closely the information obtained at the reading step matches the information obtained before the maintaining step and permitting access if the score is above a predetermined score and invoking the steps wherein no match is determined if the score is below a predetermined score.

* * * * *